(12) United States Patent
Lee

(10) Patent No.: US 7,930,095 B2
(45) Date of Patent: Apr. 19, 2011

(54) APPARATUS FOR PROVIDING TRAFFIC INFORMATION FOR EACH LANE AND USING THE INFORMATION

(75) Inventor: Sun Min Lee, Pyeongtaek-si (KR)

(73) Assignee: LG Electronics Inc, Seoul (KR)

( * ) Notice: Subject to any disclaimer, the term of this patent is extended or adjusted under 35 U.S.C. 154(b) by 661 days.

(21) Appl. No.: 11/831,774

(22) Filed: Jul. 31, 2007

(65) Prior Publication Data
US 2008/0033632 A1 Feb. 7, 2008

(30) Foreign Application Priority Data
Aug. 10, 2006 (KR) .................. 10-2006-0075538

(51) Int. Cl.
G08G 1/0962 (2006.01)

(52) U.S. Cl. ........................................ 701/119
(58) Field of Classification Search ............. 701/117
See application file for complete search history.

(56) References Cited

U.S. PATENT DOCUMENTS

| | | | | |
|---|---|---|---|---|
| 5,206,811 A * | 4/1993 | Itoh et al. | | 701/211 |
| 5,839,086 A * | 11/1998 | Hirano | | 701/201 |
| 5,878,367 A * | 3/1999 | Lee et al. | | 701/117 |
| 5,917,432 A * | 6/1999 | Rathbone | | 340/907 |
| 6,269,304 B1 * | 7/2001 | Kaji et al. | | 701/209 |
| 6,300,883 B1 * | 10/2001 | Tyburski et al. | | 340/933 |
| 6,326,902 B1 * | 12/2001 | Tyburski | | 340/933 |
| 6,417,785 B1 * | 7/2002 | Tyburski | | 340/941 |
| 6,587,781 B2 * | 7/2003 | Feldman et al. | | 701/117 |
| 6,744,378 B1 * | 6/2004 | Tyburski | | 340/933 |
| 7,471,212 B2 * | 12/2008 | Krautter et al. | | 340/901 |
| 2002/0177947 A1 * | 11/2002 | Cayford | | 701/209 |
| 2004/0220728 A1 * | 11/2004 | Cayford | | 701/209 |
| 2006/0220913 A1 * | 10/2006 | Krautter et al. | | 340/933 |
| 2007/0185689 A1 * | 8/2007 | Muraski et al. | | 702/187 |

FOREIGN PATENT DOCUMENTS

| | | |
|---|---|---|
| CN | 1497521 A | 5/2004 |
| CN | 1584943 A | 2/2005 |
| JP | 6-348997 A | 12/1994 |
| JP | 2002-250635 A | 9/2002 |
| JP | 2004-272839 A | 9/2004 |
| JP | 2005-300209 A | 10/2005 |
| JP | 2005-345428 A | 12/2005 |
| KR | 10-2002-0065659 A | 8/2002 |
| KR | 2003-0021777 A | 3/2003 |

* cited by examiner

Primary Examiner — Thomas G Black
Assistant Examiner — Shelley Chen
(74) Attorney, Agent, or Firm — Birch, Stewart, Kolasch & Birch, LLP

(57) ABSTRACT

A method and device for providing traffic information (e.g., congestion & travel-time information, road obstruction information, etc.) for each lane. The method includes encoding traffic information, including creating status information including traffic information on each individual lane belonging to a road link, creating location information about the road link, and creating a traffic information message including the status information and location information. This method includes wirelessly transmitting the message from a server to a terminal.

18 Claims, 12 Drawing Sheets

```
<status_component(00)>:=£°Link Average Speed
    <intunti>(id),        : identifier, id£½00 hex
    <intunti>(n),         : Length, n, of component data in bytes
    <intunti>,            : Lane No. (0:unknown,1:1st lane,2:2nd lane,... )
    <intunti>;            : Speed (Km/h)
```

FIG. 4B

```
<status_component(01)>:=£°Link Travel Time
    <intunti>(id),        : identifer, id=01 hex
    <intunti>(n),         : Length, n, of component data in bytes
    <intunti>,            : Lane No. (0:unknown,1:1st lane,2:2nd lane,... )
    <intunti>;            : Time (second)
```

FIG. 5A

```
<descriptor_component(01)>:=£°The number of lanes
    <intunti>(id),        : identifer, id£½01 hex
    <intunti>(n),         : Length, n, of component data in bytes
    <intunti>;            : the number of lanes (0: unknown)
```

FIG. 5B

```
<descriptor_component(02)>:=£°Direction of Lanes
    <intunti>(id),        : identifier, id£½02 hex
    <intunti>(n),         : Length, n, of component data in bytes
    m*<lane_direction_component>; : Lane Direction Components
```

FIG. 5C

```
<lane_direction_component(00)>:=£°Lane Direction
  <intunti>(id),        : identifier, id£½00 hex
  <intunti>(n),         : Length, n, of component data in bytes
  <intunti>,            : Lane number (1,2,3,...)
  <intunti>;            : Direction (0:unknown, 1:straight, 2:left, 3:right,
                                     4:straight/left,5:straight/right)
```

| Link ID | # of Lanes | Travel Time (second) (or Average Speed) | Direction | obstruction information |
|---|---|---|---|---|
| k | 4 | 64 | 1 (straight) | |
| | | 68 | 1 (straight) | |
| | | 74 | 1 (straight) | |
| | | 80 | 5 (straight/right) | |
| k+1 | 3 | 40 | 2 (left) | |
| | | 35 | 1 (straight) | |
| | | 42 | 5 (straight/right) | |
| ⋮ | ⋮ | ⋮ | ⋮ | ⋮ |

APPARATUS FOR PROVIDING TRAFFIC INFORMATION FOR EACH LANE AND USING THE INFORMATION

This Non-provisional Application claims priority under 35 U.S.C. §119(a) on Patent Application No. 10-2006-0075538 filed in Republic of Korea on Aug. 4, 2006, the entire contents of which are hereby incorporated by reference.

BACKGROUND OF THE INVENTION

1. Field of the Invention

The present invention is related to a method and apparatus for providing road traffic information and using the provided information.

2. Description of the Related Art

Today, with the advancement of digital signal processing and communications technology, radio and TV broadcast signals are provided gradually in the form of digital data. As signals are provided in a digital form, a variety of information such as news, stock, weather, and traffic information are now supplementing the TV or radio broadcasting signals.

In particular, necessity for traffic information is constantly increasing with the increment of the number of vehicles in downtown areas, the number of vehicles during holidays, and so on. Accordingly, methods for providing traffic information as auxiliary information via satellite, terrestrial broadcast, or mobile communications network are under development.

Provision of traffic information as above is realized by the unit of a road segment. A road segment is also called as a 'link' which is a unit road segment containing no branch inside. That is to say, traffic information such as average link speed is provided for each individual road link. Multiple lanes may exist in a single road link and each lane can exhibit traffic status different from each other. Therefore, while traveling to a destination, if a driver moves along a particular lane on a particular road link and the chosen lane exhibits heavy congestion, the driver may not be able to arrive at the destination in time.

SUMMARY OF THE INVENTION

One objective of the present invention is to suggest a method for providing a driver with useful traffic information of each lane.

Another objection of the present invention is to provide a method and apparatus for providing traffic information, which address the limitations associated with the related art.

Another objective of the present invention is to provide a method and apparatus for using traffic information provided for each lane.

One method for encoding traffic information according to one aspect of the present invention comprises creating status information including traffic information about each individual lane belonging to a road link, creating location information about the road link, and creating a traffic information message including the status information and location information.

One method for decoding traffic information according to one aspect of the present invention comprises extracting a traffic information message from received signals and extracting from the extracted traffic information message, status information including traffic information about each individual lane belonging to a road link and location information about the road link.

In one embodiment according to the present invention, the location information includes an identifier for identifying a road link, number of lanes of the road link, and information about driving direction of each lane.

In one embodiment according to the present invention, the status information includes a component corresponding to each individual lane, the component including an identifying number for each lane and the average speed or travel time on the lane.

A terminal receiving traffic information according to one embodiment of the present invention displays on a screen traffic information of each lane which has been stored after decoding from received signals along with driving direction information of each lane.

In one embodiment according to the present invention, the driving direction information of each lane is obtained by decoding received traffic information signals.

In another embodiment according to the present invention, the driving direction information of each lane is obtained from pre-stored road information such as an electronic map.

In one embodiment according to the present invention, when a destination is specified, predicted arrival time leading to a specified destination is displayed on a screen for each individual lane. In the case of a destination not specified, traffic information about a road link at a current location or about the next road link lying in a path direction is displayed on a screen separately for each individual lane.

In one embodiment according to the present invention, as to the lane of driving direction leading to a specified destination, the driving direction of the lane is displayed distinctively from those of other lanes.

In another embodiment according to the present invention, as to the lane of driving direction not leading to a specified destination, the driving direction of the lane is displayed distinctively from those of other lanes.

In one embodiment according to the present invention, when the number of lanes is reduced in the next road link in a driving direction leading to a specified destination or in straight direction, the driving direction of a lane disappearing due to the reduction in the number of lanes is displayed distinctively from those of other lanes.

In one embodiment according to the present invention, when a traffic problem (due to significant difference of predicted arrival time between lanes, accident, or roadwork, etc.) exists on a path leading to a specified destination, the driving direction of a lane exhibiting the traffic problem is displayed distinctively from those of other lanes.

One apparatus for decoding traffic information according to one aspect of the present invention comprises a decoder extracting from a received traffic information message, status information including traffic information about each individual lane belonging to a road link and location information about the road link and decoding the extracted status information and location information; and a controller outputting traffic information about each lane on a screen based on the information decoded by the decoder.

One apparatus for providing a user with traffic information according to one aspect of the present invention comprises a decoder extracting from received signals, status information including driving direction and/or traffic information of each individual lane belonging to a road link and location information about the road link, a controller for outputting the extracted information through an output unit at the request of the user, and an interface unit comprising a requesting unit (e.g., button) having a function of requesting driving direction and/or traffic information of individual lanes belonging to a road link.

Another apparatus for providing a user with traffic information according to one aspect of the present invention comprises a decoder extracting from received signals, status information including driving direction and/or traffic information of each individual lane belonging to a road link and location information about the road link; and a controller for outputting the extracted information through an output unit at the request of the user. The controller, when driving direction and/or traffic information of each individual lane of a road link is not displayed on the output unit, provides an interface unit with a requesting unit (e.g., button) having a function of requesting driving direction and/or traffic information of individual lanes belonging to a road link.

An apparatus for receiving traffic information according to another embodiment of the present invention displays traffic information of each individual lane which has been stored after decoding from received signals and displays information about driving direction of each individual lane selectively on a screen.

In one embodiment, information about driving direction of each individual lane is displayed on a screen when there is a tunnel, bridge, crossroad, or road branch (an elevated road or freeway ramp, etc.) lying in a path direction.

In one embodiment, when a destination is specified, in addition to the case of displaying information about the driving direction of each lane, information about driving direction of each individual lane is displayed on a screen when a left or right turn is needed at a crossroad ahead.

In one embodiment according to the present invention, when the display of driving direction and/or traffic information of each individual lane belonging to a road link is set as inactive in an environment configuration of the apparatus, the button is provided to the interface unit and at the same time, the display of driving direction and/or traffic information of each individual lane belonging to a road link is set as active in the environment configuration.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention, illustrate the preferred embodiments of the invention, and together with the description, sense to explain the principles of the present invention. In the drawings.

DETAILED DESCRIPTION OF THE PREFERRED EMBODIMENTS

Hereinafter, according to the present invention, several embodiments will be described in detail with reference to appended drawings.

Figure 1:
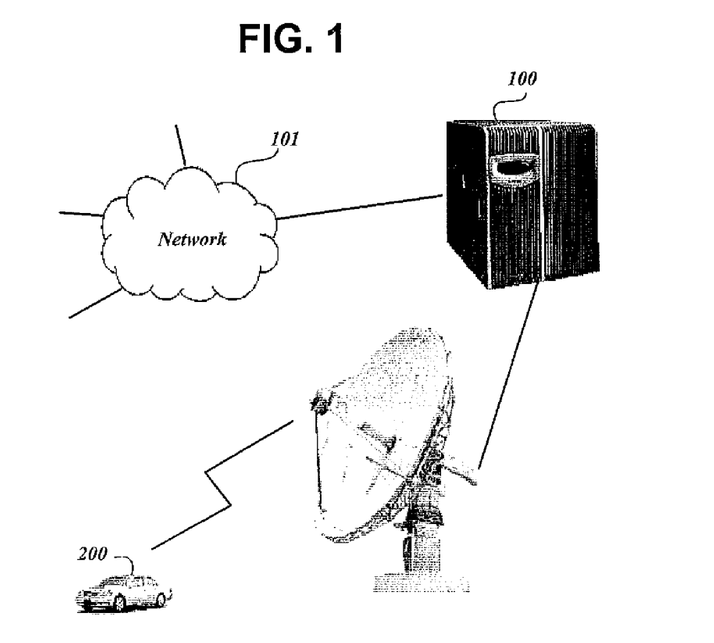
FIG. 1 illustrates a network through which traffic information is provided according to an embodiment of the present invention.

FIG. 1 illustrates a network/system through which congestion information (traffic information) is provided according to an embodiment of the present invention. A traffic information providing server or device 100 in a broadcast station reconfigures information about congestion and road conditions (e.g., accident) collected from various sources (e.g., operator input, information received from another server through a network 101 or probe cars) with respect to each road link and lane, and transmits the reconfigured information wirelessly so that a traffic information receiving terminal (e.g., a navigation terminal) installed in a car 200 or other entity can receive the information.

Figure 2A:
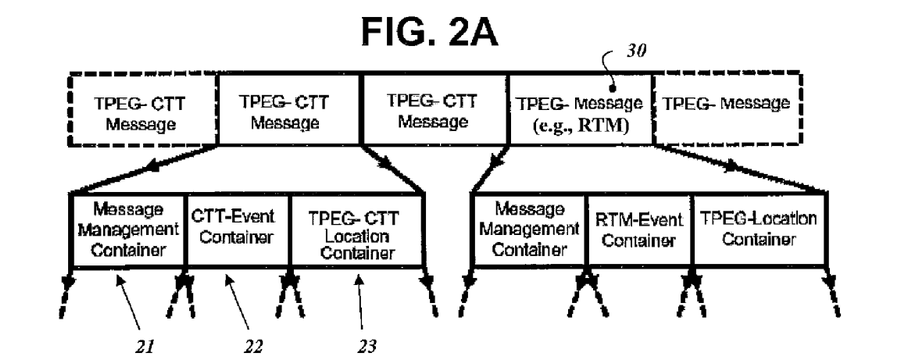
FIG. 2A illustrates an example of a format of traffic information transmitted wirelessly according to the present invention.

As shown in FIG. 2A, the format of traffic information transmitted wirelessly from the traffic information providing server 100 to the traffic information receiving terminal is composed of a sequence of message links. Hereinafter, a message link is referred to as a TPEG (Transport Protocol Export Group)-CTT (Congestion and Travel-Time information) message. A message segment in the sequence which transfers traffic (congestion) information, namely a TPEG-CTT message comprises a message management container 21, a CTT event container 22, and a TPEG-CTT location container 23. Other message segments in the segment sequence can be traffic-related information other than traffic information, for example, a TPEG-RTM (Road Traffic Message) message 30 for transferring information about an obstruction on a road.

The message management container (e.g., element 21) carries information about date, time, and occurrence time of a message, and the CTT event container (e.g., element 22)

carries traffic information about each road link and lane. The TPEG-CTT location container (e.g., element 23) carries location and description information of a road link to which traffic information is related.

Since the present invention is related to providing road traffic information for each individual lane, configuration of information and associated operations used to provide traffic information for each lane according to the present invention is provided in the following description. As for some techniques for embodiments of the present invention but not described here, one of various already-known methods for providing road traffic information with respect to a road link can be used.

Figure 2B:
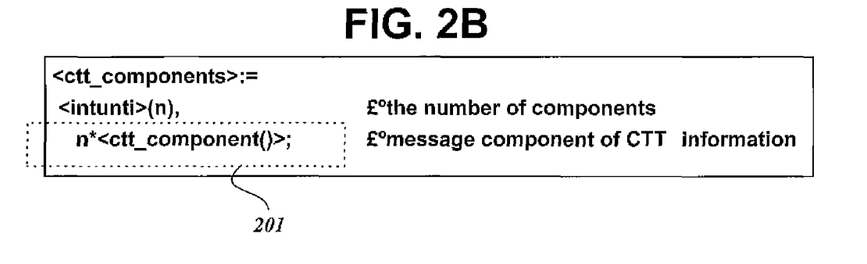
FIG. 2B illustrates an example of a syntax after which a CTT event container or a TPEG-CTT location container of FIG. 2A is composed according to the present invention.
Figure 3A:
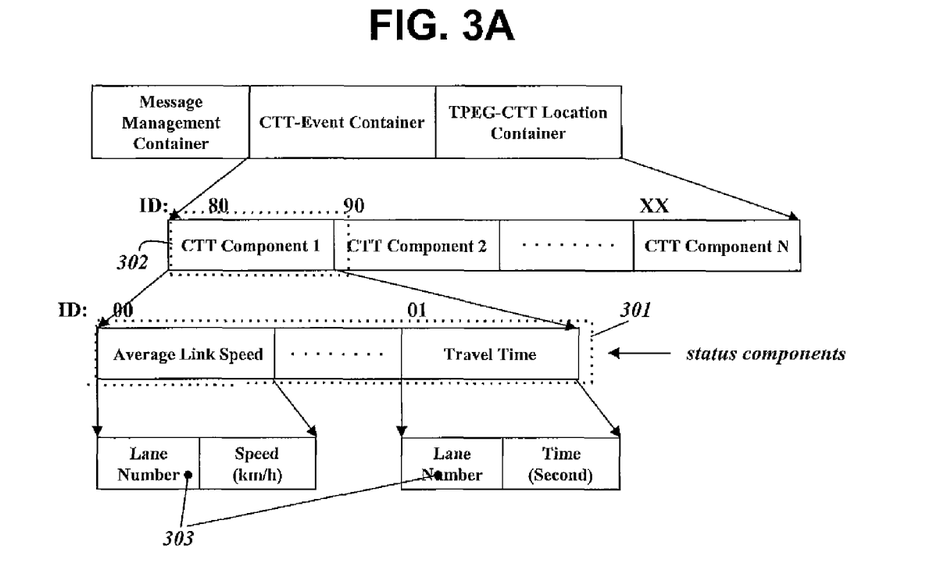
FIG. 3A illustrates an example of a transfer structure of congestion information included in a CTT event container centering around a transfer of traffic information of each individual lane according to the present invention.

As shown in FIGS. 2B and 3A, both of the CTT event container and the TPEG-CTT location container are composed of one or more than one CTT component 201. When congestion (traffic) information is loaded into a CTT component, each CTT component gets an identifier of 0x80 as shown in FIG. 3A. In the case of location information, each CTT component gets an identifier of 0x90 as shown in FIG. 3B.

As shown in FIG. 3A, for example when a CTT component includes traffic information, more than one status component 301 carrying traffic information is included and carried by a CTT component 302 with an identifier of 0x80. Each status component is transferred as traffic information carrying average link speed (status component of an identifier 0x00) or link travel time (status component of an identifier 0x01). Information 303 about a lane to which the corresponding average link speed or link travel tune is related is also transferred by the corresponding status component. Therefore, if the number of lanes is n for a road segment (ink), each of n status components carrying traffic information of the corresponding lane is transferred for traffic information about a single link.

Figure 4A:
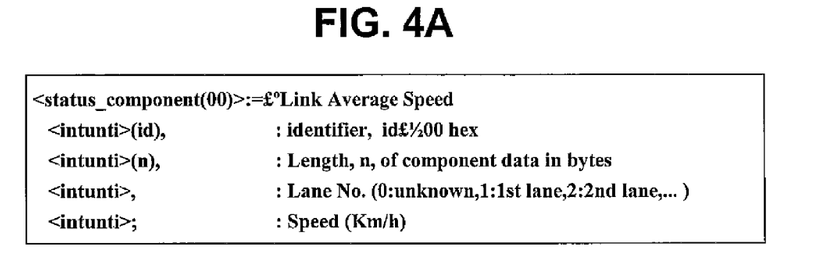
FIGS. 4A and 4B respectively illustrate examples of a syntax of average link speed and link travel time loaded into a CTT component of FIG. 3A.
Figure 4B:
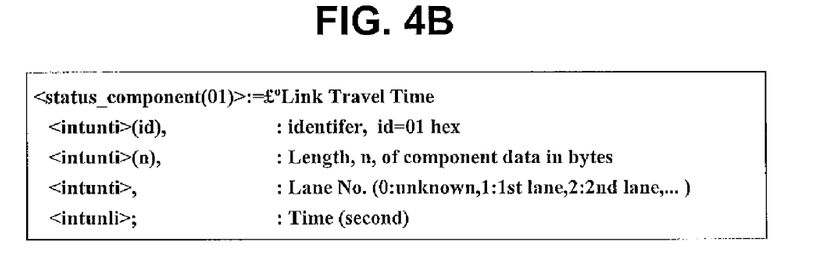

FIGS. 4A and 4B respectively illustrate syntax of a structure of individual status component (e.g., the element 301) transferring average link speed and link travel time. A number can be utilized to specify a lane number where the number can denote, namely, the lane number. When the lane number is not known, for instance, a value of 0 is assigned to the corresponding field. When 0 is assigned, the terminal (e.g., the car 200) receiving the information can interpret that the average link speed or link travel time carried by the status component is related to a corresponding link whose lanes are not distinguished from each other.

Figure 3B:
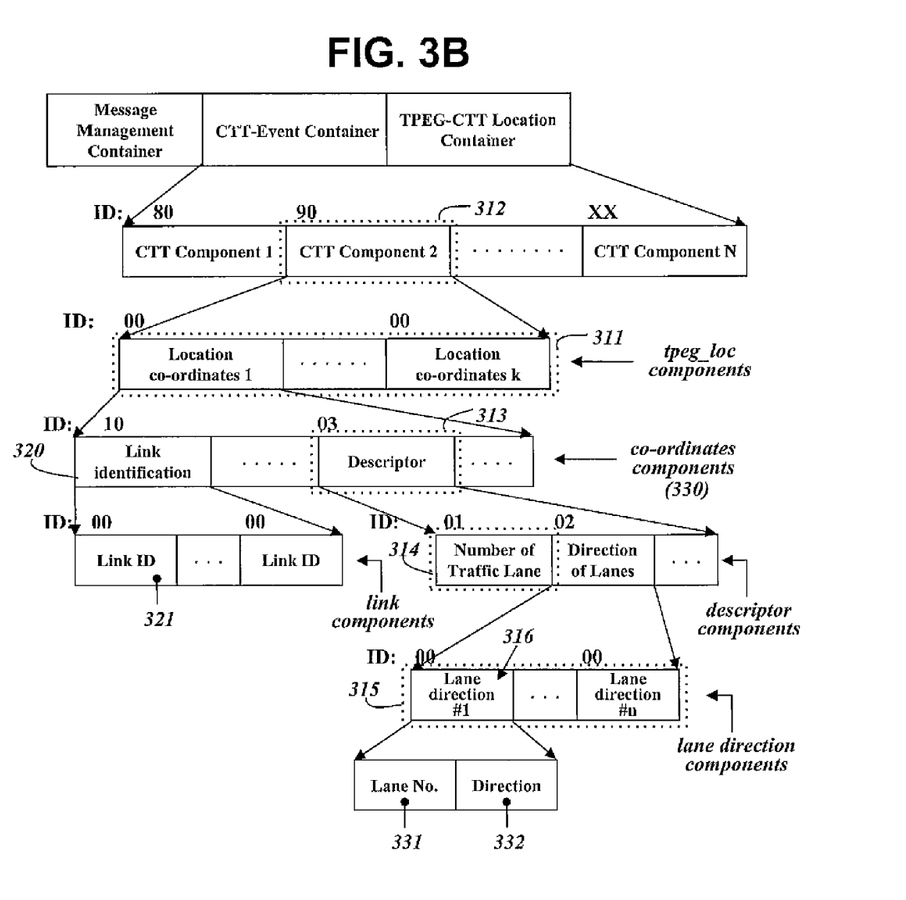
FIG. 3B illustrates an example of a transfer structure of information about a road link included with a TPEG-CTT location container centering around a transfer of lane information of a road link according to the present invention.

Information about a link for which traffic information of each individual lane is provided is carried by a succeeding TPEG-CTT location container, where FIG. 3B is the corresponding example.

As shown in FIG. 3B, when a CTT component includes location information of a road link, more than one TPEG location component (Tpeg_loc_component) 311 is carried by a CTT component 312 having an identifier of 0x90. Each TPEG location component 311 carries location coordinate information having an identifier of 0x00. The location coordinate information carries more than one coordinates component 330.

A variety of information is loaded into each coordinates component 330 depending on the identifier. For example, identifying information, longitude and latitude coordinates, vertex, type information, and description information of a link can be loaded into each coordinates component 330.

As shown in FIG. 3B, a link identifier 320 (coordinates component of an identifier 0x10) carries ID 321 of a road segment (or road segments), namely link (or links) to which traffic information transferred by the status component described above is related. The ID 321 corresponds to information for identifying a road link uniquely across the entire service area of traffic information, which can be either a number or a code. Interrelationship between the traffic information carried by the status component 301 and the link identification information carried by the coordinates component 330 is determined by the order of information in the corresponding component. The same rule is applied between information carried by each coordinates component. For example, a link component of a first identifier 0x00 (which carries link ID), a descriptor component of a first identifier 0x01 (which carries information about the number of lanes), and a descriptor component of a first identifier 0x02 (which carries information about driving direction of each individual lane) are associated with each other.

Figure 5A:
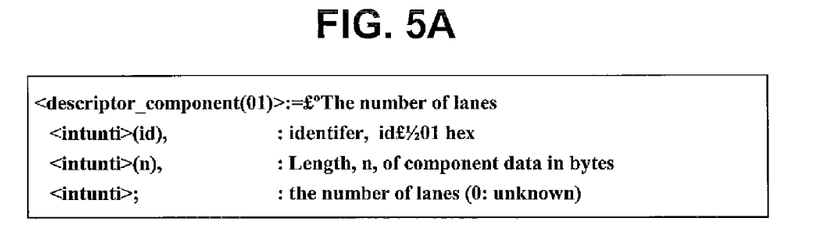
FIGS. 5A through 5C respectively illustrate examples of a syntax of number of lanes and driving direction information about each individual lane loaded into a CTT component of FIG. 3B.
Figure 5B:
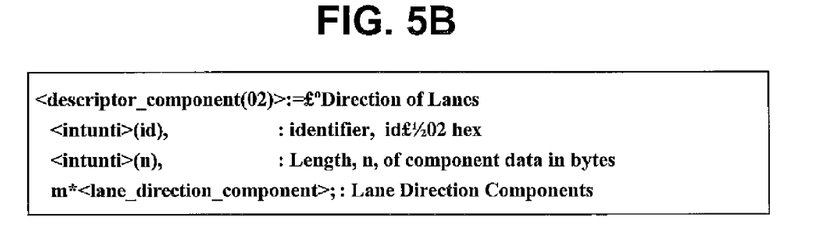
Figure 5C:
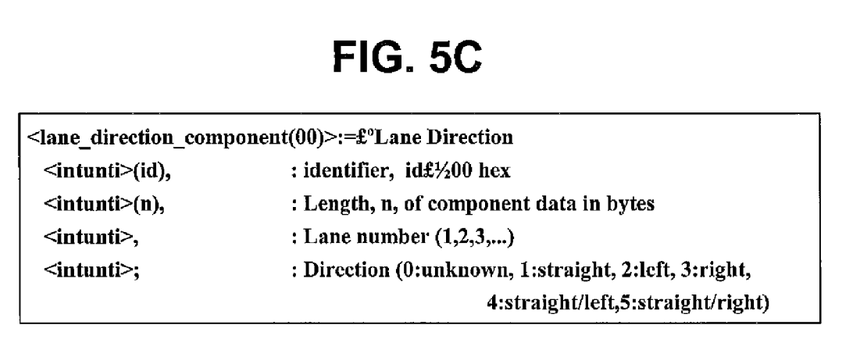

As shown it FIG. 3B, the server 100 loads information about lanes of a link into a descriptor (a coordinates component of an identifier 0x03) 313 and thus transfers the information. In addition to the lane information of a link, a variety of description information about a link, e.g., link name is also transferred by the descriptor 313, which has no relevance to the present invention and consequently, further description is not given. Information about the lanes of a link is composed of the number of lanes and driving directions of respective lanes. The number of lanes is transferred by a descriptor component 314 of an identifier 0x01, the information of which is prepared according to the syntax of FIG. 5A. Here, when the information about the number of lanes is not given, a value of 0 is assigned to the corresponding field and thus transferred. The server 100 configures information about driving direction of each individual lane according to the syntax of FIG. 5B and transfers the information through a descriptor component of au identifier 0x02. The transfer is carried out in such a way that a lane direction component is prepared for each individual lane. As shown in FIG. 3B, if the number of lanes of a road link is n, n lane direction components 315 are loaded into the descriptor component 313 of an identifier 0x02. At least one lane direction field for transferring driving direction information about a lane (lane direction component of an identifier 0x00) 316 is provided in the lane direction component 315, is prepared according to the syntax illustrated in FIG. 5C and includes information about the corresponding lane number 331 and driving direction 332. The lane number 331 records a value indicating the corresponding lane. For example, '1' is recorded for a first lane and '2' for a second lane. The drilling direction 332 records a value indicating a driving direction. As an example of a value illustrating a driving direction, when the corresponding lane is in a straight direction, '1' is recorded; '2' is recorded for left turn; '3' for right turn; '4' for straight/left turn; '5' for straight/right turn; and '0' is recorded for the case of no information about driving direction. The above are just examples and it is obviously understood that different numbers or other means can be assigned to each direction.

When an obstruction on a road (accident or roadworks) is included in the current traffic information collected from various sources, the server 100 configures this information as a TPEG-RTM message described above and thus transfers the information.

Figure 6:
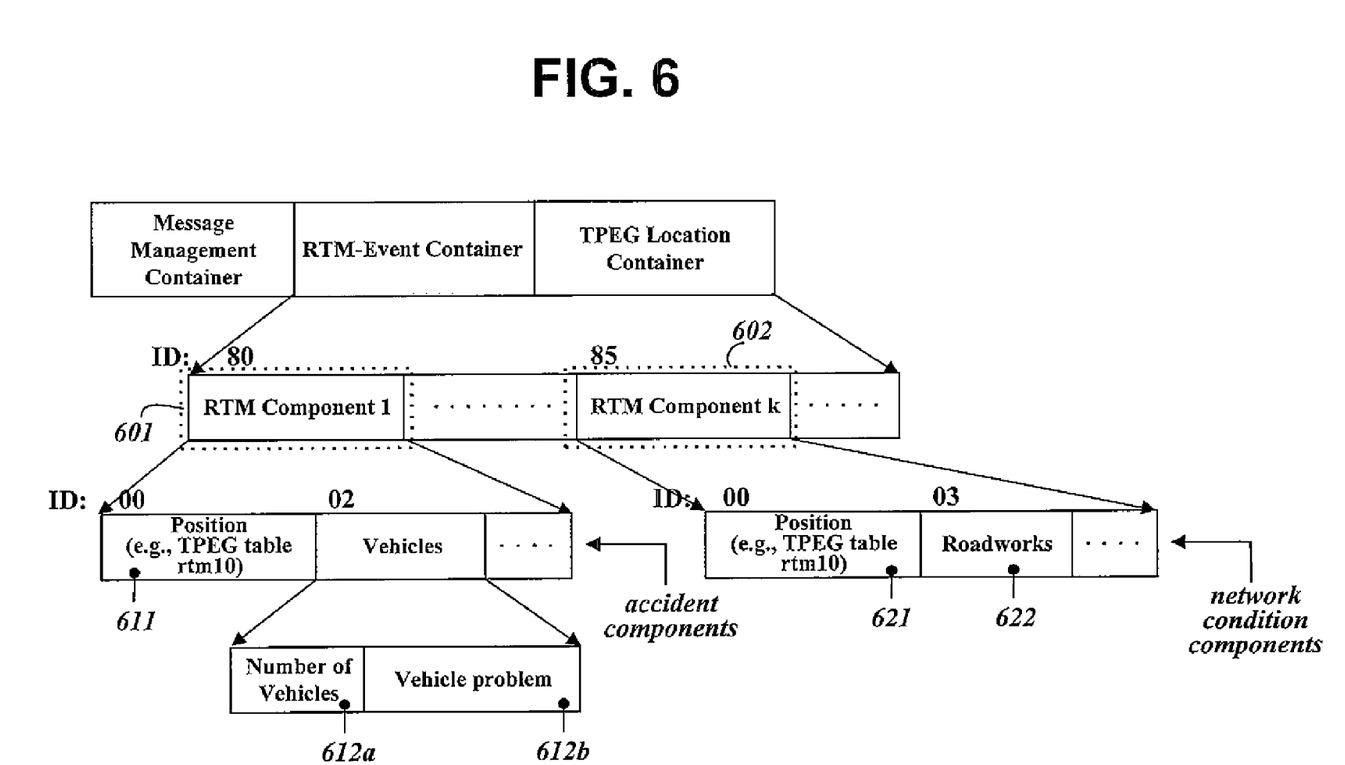
FIG. 6 illustrates an example of a transfer structure of information about road conditions (obstacles, etc.) included in an RTM event container in the case of a car accident and roadwork according to the present invention.

FIG. 6 illustrates an example of a TPEG-RTM (e.g., the clement 30 in FIG. 2A) message through which the server 100 transfers information about an obstruction on a road. In the example of FIG. 6, although an identifier for an RTM component for transferring information about an obstruction on a road uses the same identifier 0x80 as that of a CTT component described above, whether a component in question is a CTT component or an RTM component is generally determined by information carried by a message management container at the front. Accordingly, the traffic information receiving terminal does not exhibit misidentification or confusion as to recognizing each component. As shown in FIG. 6, the TPEG-RTM message includes a message management container, a RTM-event container, and a TPEG location container The RTM-event container includes one or mote RTM components 601, . . . 602, etc. Information about an obstruction caused by vehicle problems on a road is transferred by an RTM component 601 of an identifier 0x80 and information about an obstruction caused by roadwork and so on is transferred by an RTM component 602 of an identifier 0x85. In addition thereto, information about various obstacles on a road can be transferred through a relevant RTM component at the time of the occurrence.

As shown in FIG. 6, in the case of an obstruction due to a vehicle problem, information about the location of a vehicle problem 611, the number of problem vehicles 612A, and a cause of the vehicle problem 612B is prepared and transferred; in the case of an obstruction due to roadwork and so on, information about the location of roadwork 621, type of roadwork 622, etc. is prepared and transferred. Information about lanes causing a traffic problem is contained in the fields 611, 621 which transfer information about location of an obstruction. For example, if a road corresponds to a four-lane one way road and a vehicle problem occurs or roadworks are underway at a third and fourth lane, information specifying the third and fourth lane is loaded into the information fields 611, 621 about the corresponding locations. A method for representing information about lanes can be defined in many ways and a definition according to a table rtm10 defined by an already-known TPEG RTM application can be adopted.

As to the cause of the vehicle problem 612B, a value denoting, for example, 'unknown', 'overturn', 'fire', or 'accident' can be recorded; and a value denoting 'unknown', 'maintenance', 'subway construction', or 'road painting' can be recorded in the type of roadworks 622.

Figure 7:
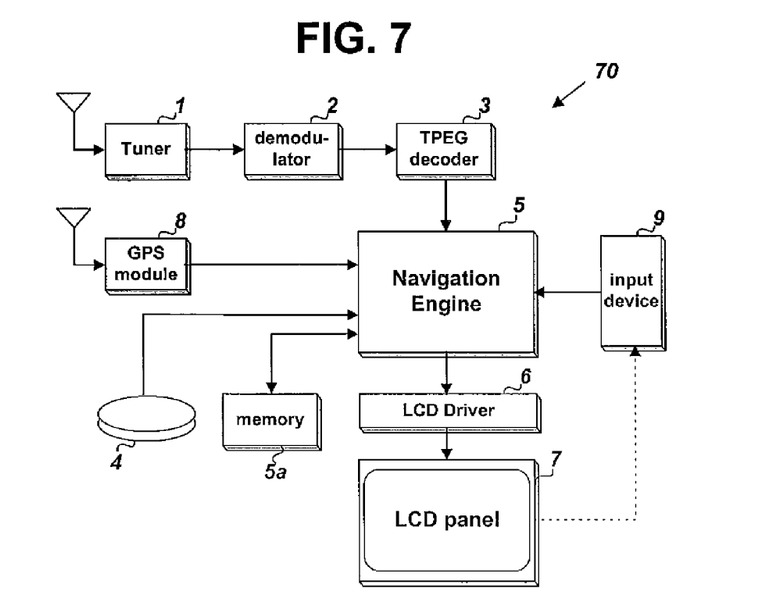
FIG. 7 illustrates a block diagram of a navigation terminal that receives traffic information transmitted from a secret in accordance with one embodiment of the present invention.

FIG. 7 is a block diagram of a navigation terminal 70 that receives traffic information transmitted from the server 100 in accordance with one embodiment of the invention. The terminal 70 can be provided in other device/entity such as the car 200 in FIG. 1. The terminal 70 of FIG. 7 comprises a tuner 1 for resonating at the required frequency band of received traffic information signals and subsequently outputting modulated traffic information signals, a demodulator 2 outputting traffic information signals by demodulating the modulated traffic information signals, a TPEG decoder 3 decoding the demodulated traffic information signals and acquiring traffic information including a variety of road traffic information and obstruction information, a GPS module 8 for calculating a current position (e.g., latitude, longitude, and altitude) by receiving signals from a plurality of satellites, a storage means or unit 4 for storing a variety of graphic information, an input device 9 for receiving a user's input, a navigation engine 5 for controlling a screen display based on the user's input, current location, and acquired traffic information, a memory 5A to which necessary or other information is stored temporarily, an LCD panel or other display unit 7 for video display' and an LCD driver 6 for feeding driving signals to the LCD panel 7 according to graphic data for display. The input device 9 can be an interface equipped on the LCD panel 7, e.g., a touch screen. For the convenience of description below, the storage means 4 is assumed to be with or without an electronic map in which information about each link and lane information and nodes of the link are stored. The terminal 70 can include other components, and all components of the terminal 70 are operatively coupled and configured.

The tuner 1 resonates at signals that the server 100 transmits, and the demodulator 2 demodulates and outputs the resonating signals in a predetermined way. The TPEG decoder 3 then extracts from the input demodulation signals a TPEG message which is transmitted with the structure of FIGS. 2A and 2B, FIGS. 3A and 3B, FIGS. 4A and 4B, FIGS. 5A through 5C, and/or FIG. 6 and stores the TPEG message temporarily. Each of the temporarily stored TPEG messages is interpreted and necessary information and/or control data relevant to the content of the message are delivered to the navigation engine 5. Although the TPEG decoder 3 delivers a variety of information and/or control data to the navigation engine 5, since the present invention is related to providing traffic information and obstruction information of each individual lane of a link, descriptions in the following are given centering around a process of providing traffic information for each individual lane for the sake of brevity.

The TPEG decoder 3 extracts date/time and message occurrence time from a message management container of each TPEG message, determines from information of 'message element' whether a succeeding container is a CTT event container or an RTM event container. If the succeeding container corresponds to either of the two, information obtained from a CTT component or an RTM component within the container is delivered in order for a display operation in accordance with traffic information and obstruction information to be carried out by the navigation engine 5 for each individual lane. Location information corresponding to currently transferred traffic information is obtained from a succeeding TPEG-CTT location container. The location information includes position coordinates of a start and end point (longitude and latitude) or link ID assigned to a road link depending on type information of a TPEG-CTT location container. Also, the TPEG-CTT location container further includes lane information of each link (number of lanes and driving direction of each lane). When the storage means 4 is provided, a road segment corresponding to a received link ID is determined with reference to the information about each link and node stored in the storage means 4. Also, the navigation engine 5, when necessary, converts position coordinates of the received link to a link ID or vice versa.

If the storage means 4 is provided with an electronic map (the entire information about each individual link and geographic information), real-time information, e.g., traffic information and road obstruction information can be obtained from the traffic information provided from the server 100, whereas stationary information, e.g., location information of a road, lane information, etc. can be obtained from information contained in the electronic map. Whether the stationary information utilizes the information provided from the server 100 or information already contained in the electronic map is only the matter of choice and the method for providing a user with the traffic information described below can be equally applied irrespective of the source of stationary information. Difference exists only in using either the electronic map information contained in the storage means 4 or the decoded information stored in the memory 5A when there is a need for stationary information about a road (location, lane information, etc.).

Figure 8:
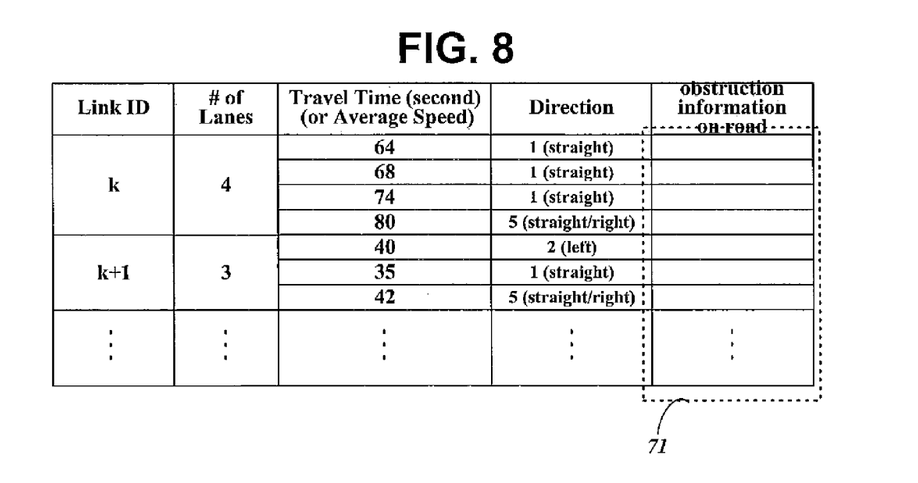
FIG. 8 illustrates an example of storing decoded traffic information separately for each lane according to one embodiment of the present invention.

The navigation engine 5 stores received traffic information and road obstruction information in the memory 5A for each link and lane in the form of FIG. 8. At this moment, road obstruction information (accident, roadworks, etc.) about the corresponding lane of the corresponding link is stored in such a way that a received road obstruction code is stored in association with the corresponding lane of the corresponding link 71 as shown in FIG. 8. Types of stored information in FIG. 8 are just a simple example; besides, a variety of other traffic information provided from the server 100 can be stored in the form of an indexical structure or others.

Figure 9:
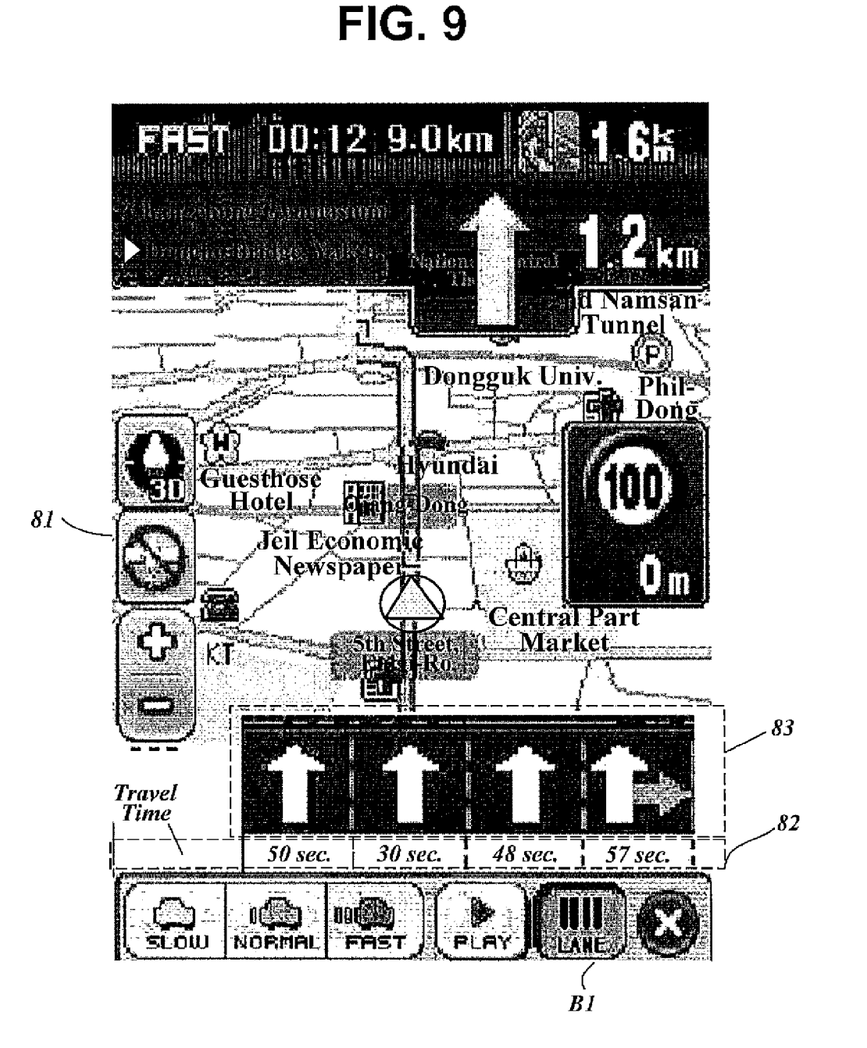
FIG. 9 illustrates an example of displaying travel time and driving direction separately for each individual lane on a screen according to one embodiment of the present invention.

The navigation engine 5, when the storage means 4 includes an electronic map, reads out a necessary part of the electronic map with reference to the current position coordinates received from the GPS module 8 (an area centered on a current location, the size of which is varied according to a current display scale) and displays the read out part in the form of FIG. 9 on the LCD panel 7 through the driver 6. At this moment, a particular graphic symbol 81 is marked at a position corresponding to a current location.

The navigation engine 5 reads travel title (or average speed) of each lane belonging to a current driving link from the information stored in the memory 5A as shown in FIG. 8 and displays the travel time 82 on the screen for each individual lane as shown in FIG. 9. Also, driving direction information 83 for each individual lane of a current driving road link is read and displayed together on the screen. Information about each lane (travel time or average speed, and driving direction information for each lane) may not be provided for a normal case but instead can be provided according to a user's selection of a soft button B1 requesting the activation of display of the corresponding information. At this point, a soft button can be a physical key on the input device 9, where the function carried out at the selection of the button is selectively changed, and information notifying of the function due to the selection of the button at a particular time is displayed at the corresponding position on the LCD panel 7; or a soft button can be a touch-screen type button, the function of which is displayed on the LCD panel 7 and choice thereof is done on the panel. It is equally possible to implement a button for requesting the activation of information display of each lane on the input device 9 as a key whose function is fixed. In another embodiment according to the present invention, instead of implementing a button for requesting the activation of information display of each lane or together with providing the button, the activation of information display of each lane can be controlled by setting as active or inactive in the configuration of the terminal 70. That is to say, when the user sets 'information display of each lane' as active in a configuration screen provided by the navigation engine 5, the information 82, 83 about each lane is always displayed as shown in FIG. 9, whereas the corresponding information is not displayed when set as inactive. In this way, control of activation/deactivation of information for each lane through a button or environment configuration can be equally applied to the case of different information about lanes (e.g., predicted arrival time of each lane or obstruction information on a particular lane) described below. In one embodiment according to the present invention, when 'information display of each lane' is set as inactive in environment configuration, the navigation engine 5 provides a soft button requesting the activation of information display of each lane. Where the button is requested, the navigation engine 5 changes 'information display of each lane' to active state in environment configuration and at the same time, displays information about each lane as shown in FIG. 9.

Depending on the user's choice, instead of traffic information and lane direction information about a current driving road segment, those about a link lying ahead or a link on the left or on the right of path direction can be displayed.

Figure 10:
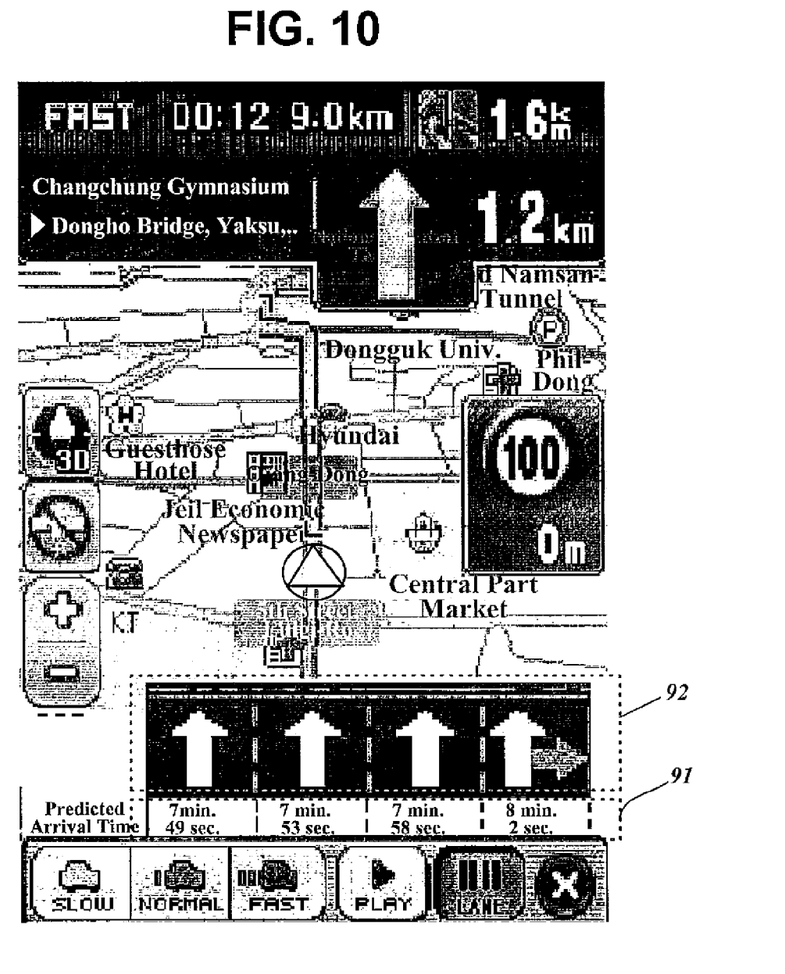
FIG. 10 illustrates an example of displaying predicted arrival time and driving direction separately for each individual lane leading to a specified destination according to one embodiment of the present invention.
Figure 11A:
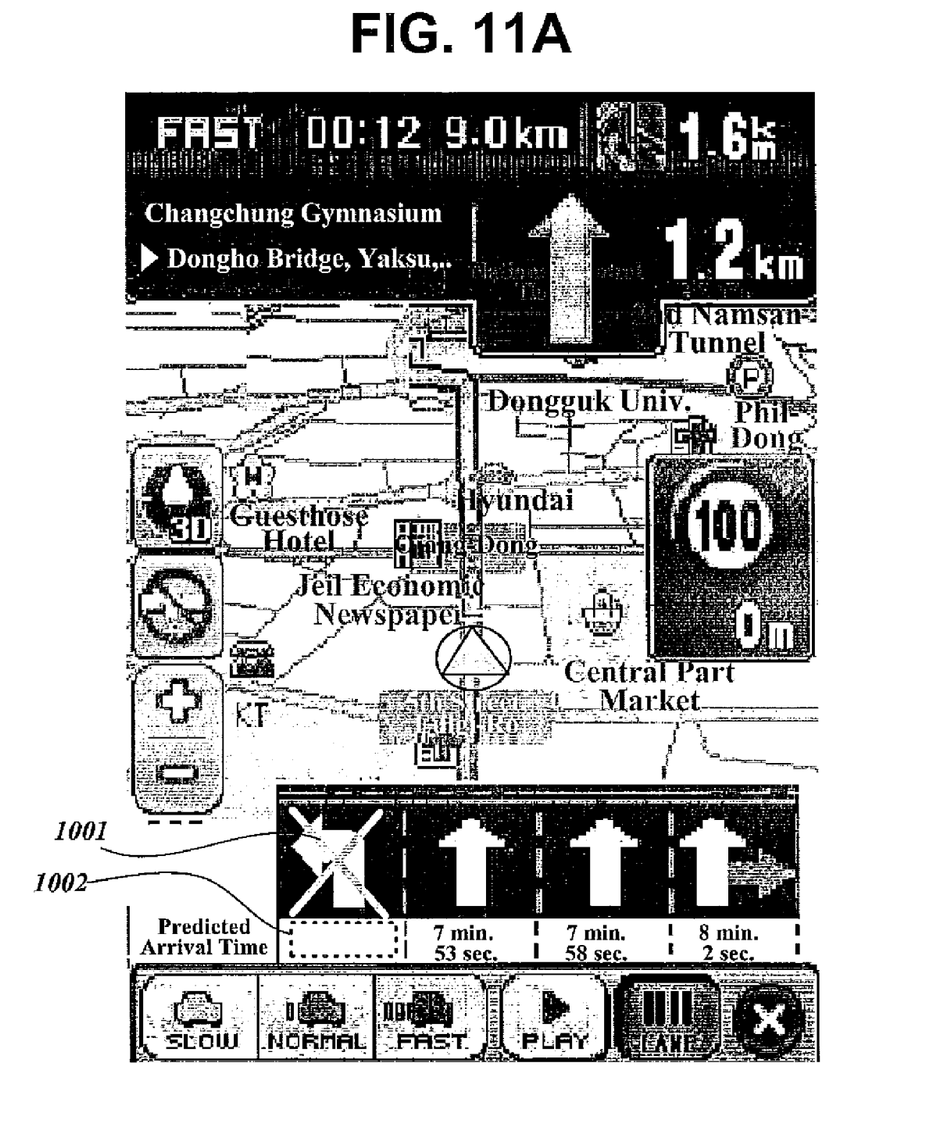
FIGS. 11A through 11C respectively illustrate an example of separately displaying driving direction of each individual lane in various ways according to road driving conditions in accordance with one embodiment of the present invention.

If the user of the terminal 70 has specified a destination through the input device 9, the navigation engine 5 determines an optimal path (e.g., shortest distance or shortest time) to arrive at the destination. The shortest distance path is the one where the sum of lengths of links belonging to a set of road links is shortest. The shortest time path is the one where the sum of travel time of links belonging to a set of road links is shortest. After an optimal path is determined, the navigation engine 5, as shown in FIG. 10, displays predicted arrival time 91 of each individual lane of the path to the destination. The predicted arrival time of each individual lane is a sum of travel time of the same lanes on a driving path. When the number of lanes is different between driving links, e.g., the number of lanes of the next driving link is reduced, travel time of the outermost lane utilizes that of the next inner lane. For example, when a current link is a four-lane road and the next link is a three-lane road, in order to obtain predicted arrival time of each individual lane to be displayed for the user, since there is no fourth lane in the next link, predicted arrival time for the fourth lane is obtained by making use of travel time of the third lane for the next link. As to the driving direction of each lane, the driving direction 92 of each lane about a current link is displayed. A lane having a driving direction leading to the specified destination can be displayed in such a way distinguished from other displayed icons of different driving directions (e.g., flickering, color inversion, or different color). In another embodiment according to the present invention, as shown in FIG. 11A, as to an icon of the lane direction not leading to the specified destination, a graphic overlay for lane rejection 1001 can be applied to the icon. Subsequently, for the lane marked as lane rejection as above, predicted arrival time is deleted (1002) from the screen. When the driving direction of the deleted lane corresponds again to the drilling direction to a destination in the next link, graphic overlay for the lane rejection is removed and the predicted arrival time is again displayed on the screen.

Figure 11B:
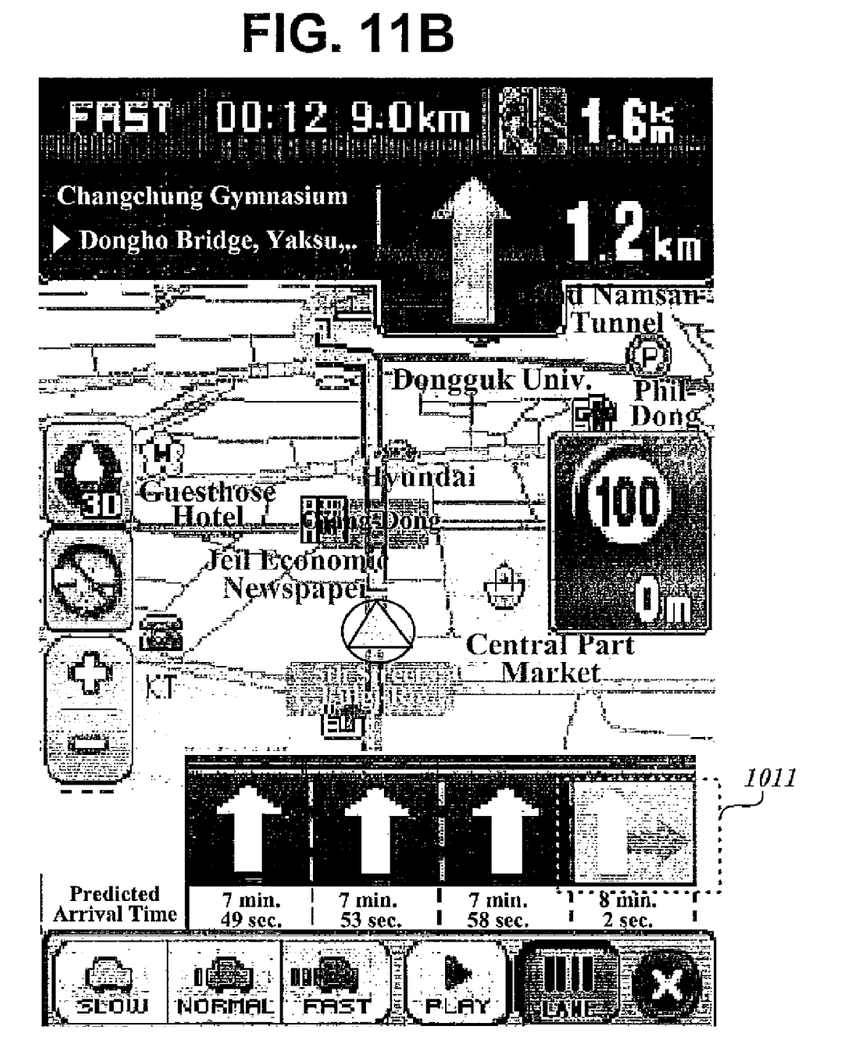

The next link on a path leading to a specified destination or the next link lying on a current path direction in the case of no specified destination may have a smaller number of lanes than that of a current link. For this case, as shown in FIG. 11B, the navigation engine 5 displays a direction icon 1011 for a lane disappearing due to a reduction of the number of lanes distinctively by using an icon color lighter than those of other direction icons, thereby letting the user recognize the reduction of lanes. Reduction of the number of lanes in the next link can also be notified in another way or in a different form.

Figure 11C:
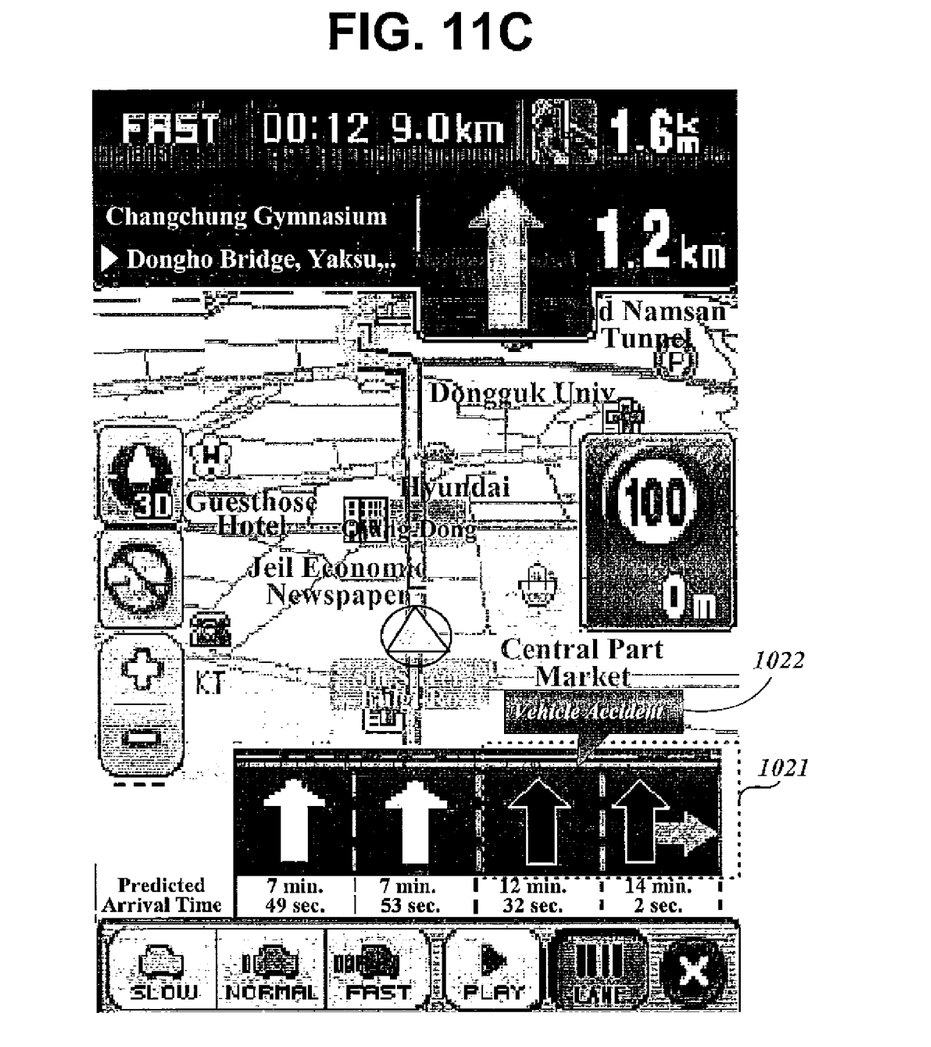

When there is an obstruction on a path leading to a specified destination, as to a lane having the obstruction, the direction icon of the corresponding lane can be displayed differently from those of other lanes by utilizing a distinctive color or a different size. FIG. 11C illustrates a display example thereof, where a direction icon 1021 of the corresponding lane is displayed in red color in order to indicate that obstructions exist in the third and fourth lanes of the road segment belonging to the path leading to the destination. When the user requests a detailed description about the corresponding icon 1021, by reading codes indicative of a road obstruction and the related cause received with respect to the corresponding link or to the most adjacent link among links belonging to the path (which is the case of receiving obstruction information about multiple links on a path), description 1022 about the code (car accident, subway construction, etc.) can be displayed on the screen.

If, for no particular reason, the received predicted arrival time to a destination calculated from travel time according to each individual lane of each link reveals a severe deviation, for example, if the predicted arrival time of a particular lane is longer more than 30% of average or maximums value of those of other lanes, a direction icon of the corresponding lane can be displayed by using the same form for indicating a road obstruction as shown in FIG. 11C. At this point, when the user requests a detailed description, a notice such as "arrival time delayed" can be displayed on the screen.

In another example according to the present invention, the navigation engine 5 does not always display direction icons of each lane on the screen but can display direction icons depending on current driving conditions. For example, in the case of a current destination not specified, display can be activated when a tunnel, bridge, crossroad, or road branch (an elevated road or freeway ramp, etc.) is within 300 meters ahead. In the case of a current destination specified, besides displaying as is done for the case of no specified destination, a direction icon can be displayed on the screen when a left turn or right turn should be made at a crossroad ahead.

The various embodiments and examples of the present invention described in detail in the above enable a driver driving in a big city of crowded traffic to arrive at a desired destination in less time by displaying and making use of estimated traffic information and obstruction information of each individual lane of a road. Since the present invention can distribute traffic appropriately across lanes, efficient use of road resources can be achieved.

The foregoing description of preferred embodiments of the present invention has been presented for purposes of illustration. Thus, those skilled in the art may utilize the invention and various embodiments with improvements, modifications, substitutions, or additions within the spirit and scope of the invention as defined by the following appended claims.

What is claimed is:

1. A method for providing traffic information from a server to a motor vehicle via a wireless network, comprising:
   wirelessly transmitting, from the server to the motor vehicle, a traffic information message including status information about a road link toward a predetermined destination and corresponding road link location information, the status information including traffic information about a first lane of the road link toward the predetermined destination and traffic information about a second lane of the road link toward the predetermined destination, the traffic information including each of lane-specific time-to-destination information, lane-specific speed information and lane-specific directionality information for each of the first and second lanes.

2. The method of claim 1, wherein the location information includes an identifier for identifying the road link.

3. The method of claim 2, wherein the location information further includes information identifying a number of the lanes belonging to the road link.

4. The method of claim 1, wherein the traffic information message includes event information including information on an obstruction on one of the first and second lanes.

5. A method for providing traffic information from a server to a motor vehicle via a wireless network, comprising:
   wirelessly receiving, by the motor vehicle from the server, a traffic information message including the status information about a road link toward a predetermined destination and corresponding road link location information, the status information including traffic information about a first lane of the road link toward the predetermined destination and traffic information about a second lane of the road link toward the predetermined, the traffic information including each of lane-specific time-to-destination information, lane-specific speed information and lane-specific directionality information for each of the first and second lanes; and
   simultaneously displaying, on a display in the motor vehicle, the status information for each of the first and second lanes.

6. The method of claim 5, wherein the location information includes an identifier for identifying the road link.

7. The method of claim 6, wherein the location information further includes information identifying a number of the lanes belonging to the road link.

8. The method of claim 5, wherein the traffic information message includes event information including information on an obstruction on one of the first and second lanes.

9. An apparatus for decoding traffic information, comprising:
   a communication device configured to wirelessly receive a traffic information message including the status information about a road link toward a predetermined destination and corresponding road link location information, the status information including traffic information about a first lane of the road link toward the predetermined destination and traffic information about a second lane of the road link toward the predetermined destination, the traffic information including each of lane-specific time-to-destination information, lane-specific speed information and lane-specific directionality information for each of the first and second lanes;
   a display configured to simultaneously display the status information for each of the first and second lanes; and
   a controller operatively connected to the communication device and the display.

10. The apparatus of claim 9, wherein the location information includes an identifier for identifying the road link.

11. The apparatus of claim 10, wherein the location information further includes information identifying a number of the lanes belonging to the road link.

12. The apparatus of claim 9, wherein the controller is configured to control the display to display a predicted arrival time to a specified destination for each of the lanes.

13. The apparatus of claim 12, wherein the controller is configured to calculate the predicted arrival time based on a sum of received traffic information of road links belonging to a path leading to the specified destination.

14. The apparatus of claim 9, wherein the controller is configured to control the display to display traffic information on a present road link or a next road link lying in a path direction separately for each of lanes.

15. The apparatus of claim 9, wherein the controller is configured to control the display to display a lane of the road link leading to a specific destination distinctively from another lane of the road link.

16. The apparatus of claim 9, wherein if a number of lanes on a path leading to a specified destination is reduced or if a number of lanes on a next road link is reduced, the controller is configured to display a corresponding disappearing lane distinctively from another lane.

17. The apparatus of claim 9, wherein the traffic information message includes event information including information on an obstruction on one of the first and second lanes.

18. The apparatus of claim 17, wherein the traffic information message includes information about an accident or roadwork on the road link.

* * * * *